Sept. 23, 1958   S. GINDOFF ET AL   2,853,241
APPARATUS FOR PRODUCTION OF FINELY DIVIDED MATERIALS
Filed Feb. 15, 1954   2 Sheets-Sheet 2
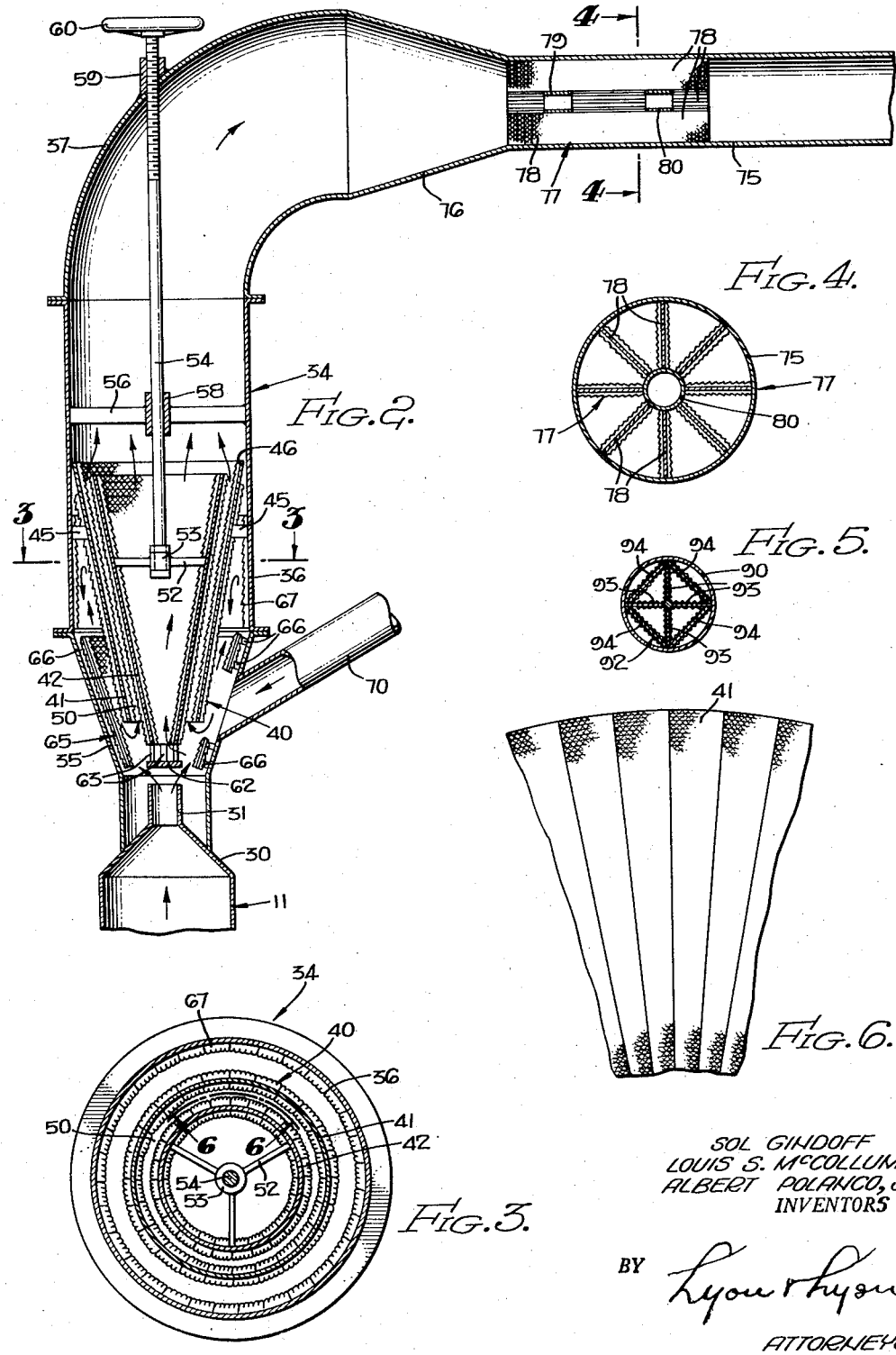
SOL GINDOFF
LOUIS S. McCOLLUM
ALBERT POLANCO, JR.
INVENTORS
BY Lyon & Lyon
ATTORNEYS

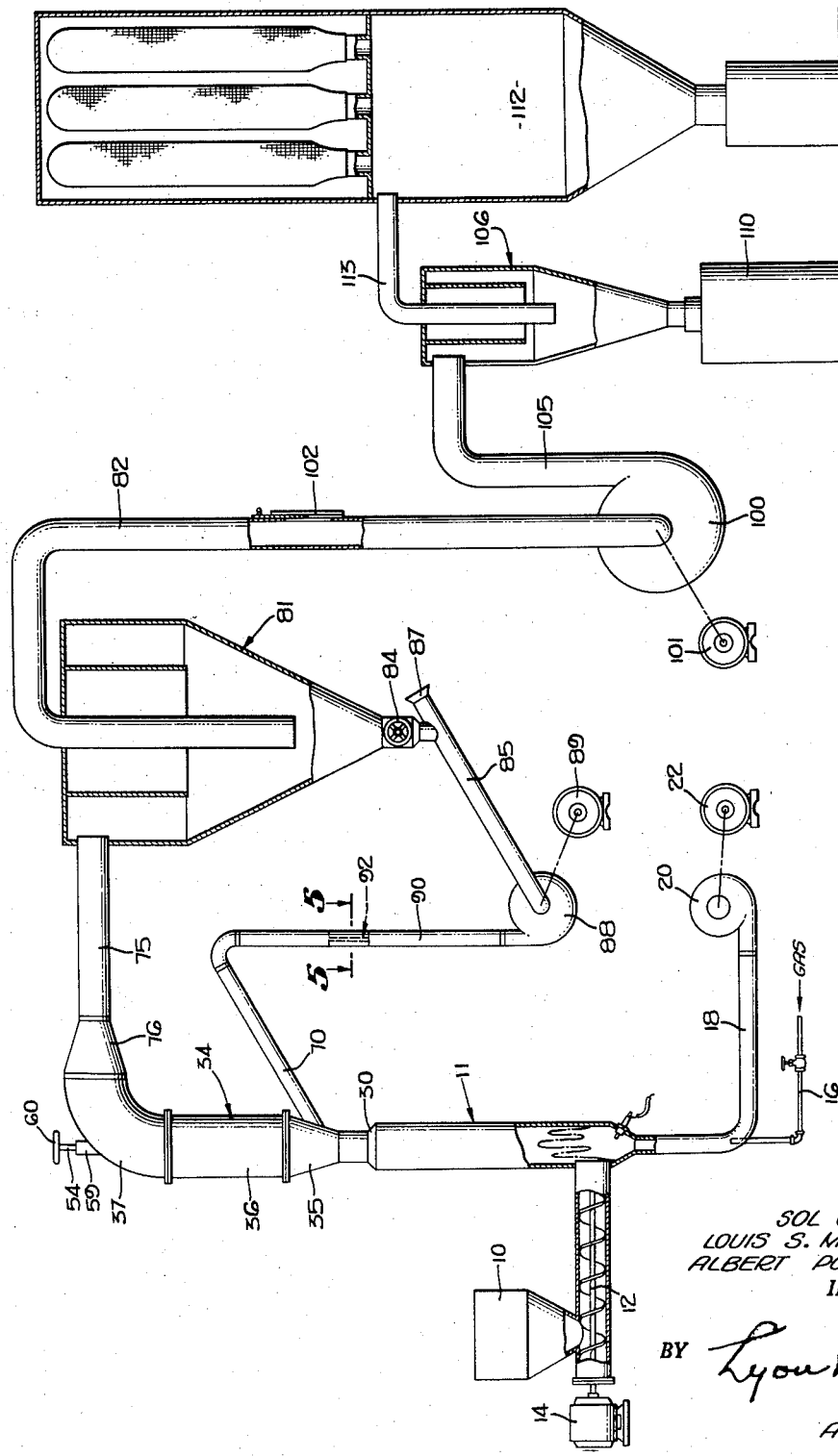

United States Patent Office 2,853,241
Patented Sept. 23, 1958

2,853,241

APPARATUS FOR PRODUCTION OF FINELY DIVIDED MATERIALS

Sol Gindoff, Los Angeles, Louis S. McCollum, North Hollywood, and Albert Polanco, Jr., Los Angeles, Calif., assignors, by direct and mesne assignments, to International Minerals & Chemical Corporation, Chicago, Ill., a corporation of New York Application February 15, 1954, Serial No. 410,065

7 Claims. (Cl. 241—65)

This invention relates generally to the handling and processing of particulate material and has particular reference to a process and apparatus for the production of finely divided particles, suitable for use as a filter aid or as a filler, from perlite ore.

Crude or raw perlite is a volcanic glass having a silica content of about 65–70% by weight, together with about 12–16% aluminum, 2–5% entrapped water, 7–10% alkali metal oxides and small amounts of oxides of iron, calcium and magnesium. A characteristic property of perlite and of similar volcanic glasses containing upwards of 2% water, is that when such material is exposed in fine particle form to high temperatures in the range 1600–2100° F., softening and rapid expansion or puffing of the particles takes place to produce a cellular expanded product having an extremely low density. Because of its low density, chemical inertness and heat resistance, fully expanded perlite has considerable value as a heat insulating material and for other applications, such as, as an aggregate in plaster, concrete and the like.

Perlite particles expanded by conventional methods contain a plurality of sealed, sponge-like air cells or individual spheres, the particles thus being capable of floating indefinitely in liquids such as water. In such expanding methods a minor amount of "fines," i. e., fractured, finely divided particles are produced. It has been found that these fines are highly suited for use as a filter aid material, since they provide a great surface area, have a low bulk density, a low wet density and, unlike the expended "whole" particles, they do not float on water and other liquids. Many attempts have been made to increase the production of such finely divided material from expanded perlite. For example, many known crushing and comminuting operations have been tried, including hammer mills, disintegrators, rubber rollers, extreme temperature changes and chemical treatment. It was discovered that many of these methods would crush and fracture the expanded perlite, but the resultant product would be unsatisfactory for use as a quality filter aid or filler, in that the particles were greyish in color, of increased bulk density and wet density, and they had a tendency to pick up impurities and to change in particle shape. One of the principal objects of this invention is, therefore, to provide a process and apparatus for the production of high-quality filter aid material from perlite ore.

Another object of this invention is to provide a novel process and apparatus for the expansion of ground perlite ore, immediately followed by controlled fracturing of the expanded particles to produce, as a primary product, perlite of low bulk density, low wet density, extreme whiteness in color, and proper particle shape suitable for use as quality filter aids for processing industries, and as fillers of controlled densities.

Another object of this invention is to provide a process and apparatus for producing high quality finely divided material preferably utilizing as a raw material what has heretofore been considered as waste material from the grinding of perlite ores, i. e., ground perlite ore of minus 30 mesh, or less.

Other objects and advantages of this invention it is believed will be readily apparent from the following detailed description of a preferred embodiment thereof when read in connection with the accompanying drawings.

In the drawings:

Figure 1 is a diagrammatic view, illustrating the process and apparatus of this invention.

Figure 2 is a fragmentary vertical sectional elevation of a portion of the expanding and fracturing apparatus.

Figure 3 is a sectional elevation taken substantially on the line 3—3 of Figure 2.

Figure 4 is a sectional elevation taken substantially on the line 4—4 of Figure 2.

Figure 5 is a sectional elevation taken substantially on the line 5—5 of Figure 1.

Figure 6 is a sectional elevation taken substantially on the line 6—6 of Figure 3.

Referring now to the drawings, the process of this invention is carried out by first feeding ground perlite ore into the feed hopper 10 of a perlite expanding furnace 11. Preferably, waste perlite ore having a particle size of −30 mesh or less is utilized, both from the standpoint of economy and the obtaining of more uniform expansion, although perlite ore of larger particle size may be used if desired. The ore is metered into the furnace 11 at a constant rate by means of the screw conveyor 12 driven by a variable speed motor 14. The furnace is supplied with fuel gas through the line 16 and with combustion air at a high velocity, through conduit 18 leading into the furnace bottom, by means of a blower 20 driven by motor 22.

The hottest area in the furnace is adjacent the perlite feed, the temperature here being that required to fully expand the ore particles. This is generally in the neighborhood of 1700° F., but the optimum temperature varies, depending upon the specific characteristics of the ore being processed as is readily apparent to those skilled in the art. In operation of the furnace, the relatively dense perlite ore is kept in suspension by the high-velocity gases of combustion until the particles become semi-fluid and expand due to the internal pressure in the particles caused by the volatilization and release of the entrapped water normally contained therein. The expanded particles, now of extremely low density, are carried upwardly through the furnace by the upwardly flowing gaseous combustion products.

Referring particularly to Figure 2, it will be noted that the furnace walls terminate at the upper end thereof in a constriction comprising a frusto-conical section 30 which leads to a greatly reduced cylindrical end section 31, thus forming, in effect, a Venturi whereby the velocity of the upwardly-rising gases and the expanded perlite particles carried thereby is greatly increased. The constriction or Venturi section 30 also tends to bring about an increase in temperature in the upper portion of the furnace thus assuring substantially complete expansion of the perlite particles and maximum friability of the particles, as well as maintaining the expanded particles at a high temperature which is a highly beneficial condition for the fracturing step to be described below. Restriction of the furnace throat also increases the pressure in the furnace, which is preferably maintained at about 5 inches of water.

The high-velocity expanded perlite particles pass through the end section 31 into the pressure equalizing, fracturing and recirculation chamber generally indicated 34. This chamber includes a lowermost conical wall section 35, an intermediate vertical cylindrical wall section 36 of greater cross-section than the furnace, and an upper elbow section 37. Mounted in the chamber 34 is an abrader cone assembly 40 comprising a nested pair of inverted frusto-conical elements 41 and 42 having open top and bottom ends. The outer conical element 41 is secured to the cylindrical wall 36 by means of strut members 45, the upper end 46 of the conical element being spaced a slight distance from the wall to provide a slip stream effect, thus preventing build-up of entrapped perlite particles. The inner conical element 42 is mounted for vertical adjustment whereby the opening 50 between the conical elements may be varied. As shown best in Figures 2 and 3, the element 42 is provided with a spider 52, having a central bushing 53 in which is received the lower end of a control and support rod 54. A spider 56 is secured to the wall 36 and is provided with a central bearing 58 receiving an intermediate portion of the rod 54 which is threaded at the upper end thereof and engaged in a threaded boss 59 on the elbow section 37. A hand wheel 60 is provided at the upper end of the rod for convenient operation thereof.

The open lower end of the inner conical element 42 is provided with a disk-like deflector 62 which is secured to spaced bars 63 depending from the conical element. It will be noted that the deflector is positioned immediately above the open end of the furnace throat and, due to the restricted flow passage thus provided, aids in maintaining a desired high temperature at the entrance to the conical elements.

Both the inner and outer surfaces of the conical elements 41 and 42 are provided with a multiplicity of protruding, impinging and abrading points or serrations, with the points being directed in a downward direction. These abrading surfaces are most closely compared to the surface of a coarse file or rasp, and preferably, as shown in Figure 6, are formed of a plurality of sections joined together. Similarly, the conical wall section 35 is provided with a conical element 65 spaced from the wall section by means of struts 66 and provided by external and internal abrading surfaces. An additional abrading surface 67 of similar construction is provided on the inner side of the cylindrical wall section 36.

Both the conical wall section 35 and the conical abrading element 65 are provided with side openings to which leads a conduit 70 for returning or recirculation of insufficiently fractured particles in a manner to be described below.

From the above description it will be understood that the hot expanded perlite particles, which are moving at an extremely high velocity as they pass out through the furnace end section or throat 31, are deflected laterally by the deflector 62. The inertia of the particles carries them upwardly in the chamber 34, a large portion striking the conical abrading element 65, a portion moving upwardly between the outer conical element 41 and the abrading surface 67, another portion moving into and up through the inside of the inner conical element 42, and a further large portion moving upwardly through the space between the inner and outer conical elements 41 and 42. The movement of the particles is illustrated by the arrows in Figure 2. It will be appreciated that the structure described results in cyclonic and direct vertical flow of the hot perlite and combustion gases in the described areas. The extremely hot and rapidly moving expanded particles strike the many abrader surfaces bringing about a partial shattering or a controlled fracturing of the particles. Although the theoretical considerations are not completely understood, it has been found that the temperature of the expanded particles themselves at the time of fracturing should be at least about 1000° F., the upper temperature limit being determined by the furnace temperature, and moreover, the fracturing should take place before the expanded particles have been given an opportunity to cool to temperatures even approaching room temperature. In other words, the expansion process should take place immediately prior to the fracturing step.

It has been found that by increasing or decreasing the opening between the inner and outer conical elements 41 and 42, through suitable manipulation of the hand wheel 60, the pressure in the furnace may be controlled, within limits, and hence the particle size and density of the perlite particles may thus be controlled. The relative position of the cones also provides a control over the temperature in the chamber so that proper particles temperature at the moment of fracturing may be obtained, and additionally the height of the inner conical element 42 provides a control over the velocity of the materials flowing between the conical elements, thus providing a control over the degree of fracturing.

The fractured perlite particles, together with particles which wholly or partially escaped fracture in the chamber 34, are blown upwardly through the upper cylindrical wall section 36, through the elbow section 37, which functions as a pressure release chamber, and thence into a conduit section 75 via a Venturi section 76 which again increases the velocity of the moving stream of fractured perlite and gas. The conduit section 75 contains a secondary abrading assembly generally indicated 77 which comprises a plurality of radially extending plates 78 provided with abrading surfaces on both sides thereof. The plates are secured at their outer ends to the conduit wall and at their inner ends to a pair of coaxial stub cylinders 79 and 80. The plates 78 are designed to provide maximum abrader area with a minimum of pressure drop in the conduit. The high-velocity perlite particles are thus again subjected to abrasion and fracturing during the pass through the assembly 77.

The perlite particles and the gaseous products of combustion leave the assembly 77 and pass into a cyclone separator 81 wherein the fractured particles are separated from the coarser unfractured or partially fractured particles, the fractured particles leaving the cyclone through the conduit 82, and the coarser particles being released by a seal valve 84 from the bottom of the cyclone, dropping into the conduit 85. This conduit is open at its flared upper end 87 for the entry of air, and communicates with a materials handling blower 88 driven by a motor 89. The blower forces the coarse particles upwardly through the conduit 90 in which is positioned an abrader assembly 92. As shown best in Figure 4, the assembly 92 comprises four radially extending plates 93 and chordal plates 94, each provided with the rasp-like abrading surfaces on both sides thereof. The particles are then dropped under pressure through the conduit 70 into the chamber 34 for recirculation, the conduit 70 being inclined at a downward angle greater than the angle of repose of the material conveyed therethrough.

It will now be understood that the chamber 34, in addition to providing a housing for the abrading means previously described, also performs the following functions: (1) it relieves and controls the back pressure on the furnace caused by the recirculation blower 88 and the load conveyed thereby; (2) it permits rapid reheating of the recirculated material by means of the high temperature gaseous products of combustion; and (3) it provides means for blending of the expanded furnace product with the recirculation load with beneficial attrition of the blending materials.

As indicated above, the low density, suitably fractured particles are removed from the cyclone separator 81 through the conduit 82, the conduit leading to a suitable blower 100 driven by the motor 101 and providing the necessary suction for product removal. The conduit 82 is provided with a slide damper 102 which is partially opened to control the suction in the conduit and hence also provides a control over the quantity and particle size of the product.

The blower 100 forces the fractured product through conduit 105 into a second cyclone separator 106 wherein the desired product comprising suitably fractured particles of expanded perlite are discharged downwardly into a packing bin 110. The exhaust from the cyclone 106 is an extremely fine by-product which is collected in a conventional bag house 112 through the conduit 113. It will be apparent to those skilled in the art that by varying the speed of the blower 100, the pressure in the second cyclone 106 and hence the amount of overflow to the bag house 112 may be controlled.

The product delivered to the packing bin 110 comprises expanded perlite particles which have been suitably fractured and abraded so that the individual spherical air cells of the conventional expanded particles are broken down to the extent that the product does not float when placed in water or other liquids. The product has a low bulk density, low wet density, is of extreme whiteness in color and of the proper particle shape for use as a high quality filter aid material and as a filler.

It will be understood to those skilled in the art that if desired, additional abrader assemblies may be inserted in portions of the apparatus other than as described above. For example, abrader assemblies may be provided in the blower housings and in other suitable locations where high abrasion or attrition could be accomplished.

In the following table are set forth specific data obtained in two pilot plant runs made in the apparatus and in accordance with the process of this invention:

|  | Run No. 1 | Run No. 2 |
|---|---|---|
| Fuel (Gas-Air) | 63.4 CFM | 60.0 CFM |
| Perlite Ore Feed | 24 lbs./hr. | 36 lbs./hr. |
| Furnace Throat Temp. | 1400° F. | 1550° F. |
| Furnace Pressure | 3.0" H₂O | 4.0" H₂O |
| Cone Pressure | 1.75" | 2.0" |
| Cyclone 81 Pressure | 1.00" | 0.75" |
| Conduit 90 Pressure | 6.5" | 7.0" |

The characteristics of the product from these runs are as follows:

|  | Run No. 1 | Run No. 2 |
|---|---|---|
| Screen Analysis | Percent | Percent |
| Plus 80 Mesh | 18.0 | 3.1 |
| Plus 100 Mesh | 26.0 | 4.1 |
| Plus 200 Mesh | 67.0 | 14.2 |
| Plus 325 Mesh | 84.4 | 47.3 |
| Wet Density | 12.5 lbs./cu. ft. | 13.6 lbs./cu. ft. |
| Bulk Density | 6.0 lbs./cu. ft. | 8.0 lbs./cu. ft. |

These products had flow rates entirely comparable with those of conventional diatomaceous earth filter aids, and of extreme whiteness in color.

While a specific embodiment of this invention has been shown and described, it is not intended to limit the same to the exact details of the construction set forth, and it embraces such changes, modifications and equivalents of the parts and their formation and arrangement as come within the purview of the appended claims.

We claim:

1. In apparatus for producing from ground perlite particulate material suitable for use as a filter aid, the combination of a vertically elongated furnace for expanding perlite particles, means for feeding ground perlite through a side opening into said furnace, means for feeding a combustion gas at a high velocity into the lower end of said furnace, the upper end of said furnace having a constricted outlet opening whereby the velocity of upwardly-rising expanded perlite particles and gaseous products of combustion is greatly increased, walls forming a chamber above and surrounding said constricted outlet, and a comminuting surface in said chamber positioned in the path of and adapted to be contacted by said upwardly-rising expanded perlite particles whereby a major portion of said particles are fractured.

2. In apparatus for producing from ground perlite particulate material suitable for use as a filter aid, the combination of a vertically elongated furnace for expanding perlite particles, means for feeding ground perlite through a side opening into said furnace, means for feeding a combustion gas at a high velocity into the lower end of said furnace, the upper end of said furnace having a constricted outlet opening whereby the velocity of upwardly-rising expanded perlite particles and gaseous products of combustion is greatly increased, walls forming a chamber above and surrounding said constricted outlet, a comminuting surface in said chamber positioned in the path of and adapted to be contacted by said upwardly-rising expanded perlite particles whereby a major portion of said particles are fractured, means for separating said fractured particles from the unfractured particles, and means for recirculating said unfractured particles to said chamber.

3. In apparatus for producing from ground perlite particulate material suitable for use as a filter aid, the combination of a vertically elongated furnace for expanding perlite particles, means for feeding ground perlite through a side opening into said furnace, means for feeding a combustion gas at a high velocity into the lower end of said furnace, the upper end of said furnace having a constricted outlet opening whereby the velocity of upwardly-rising expanded perlite particles and gaseous products of combustion is greatly increased, walls forming a chamber above and surrounding said constricted outlet, a deflector positioned in said chamber above said outlet opening, and a plurality of elements having comminuting surfaces in said chamber positioned in the path of and adapted to be contacted by said expanded perlite particles whereby a major portion of said particles are fractured.

4. In apparatus for producing from ground perlite particulate material suitable for use as a filter aid, the combination of a vertically elongated furnace for expanding perlite particles, means for feeding ground perlite through a side opening into said furnace, means for feeding a combustion gas at a high velocity into the lower end of said furnace, the upper end of said furnace having a constricted outlet opening whereby the velocity of upwardly-rising expanded perlite particles and gaseous products of combustion is greatly increased, walls forming a chamber above and surrounding said constricted outlet, a deflector positioned in said chamber above said outlet opening, a plurality of elements having comminuting surfaces in said chamber positioned in the path of and adapted to be contacted by said expanded perlite particles whereby a major portion of said particles are fractured, means for separating said fractured particles from the unfractured particles, and means for recirculating said unfractured particles to said chamber.

5. In apparatus for producing from ground perlite particulate material suitable for use as a filter aid, the combination of a vertically elongated furnace for expanding perlite particles, means for feeding ground perlite through a side opening into said furnace, means for feeding a combustion gas at a high velocity into the lower end of said furnace, the upper end of said furnace having a constricted outlet opening whereby the velocity of upwardly-rising expanded perlite particles and gaseous products of combustion is greatly increased, walls forming a cylindrical chamber above and surrounding said constricted outlet, an outer inverted conical element having an open upper end secured to said walls, the lower end of said conical element being open and positioned directly above said outlet opening, the inner and outer surfaces of said conical element being provided with rasp-like comminuting means, and an inner inverted conical element having upper and lower open ends, said inner conical element being operably connected to said walls and nested within and coaxial with said outer conical element, the inner and outer surfaces of said inner conical element being provided with rasp-like comminuting means, said comminuting means adapted to be contacted by said expanded perlite particles whereby a major portion of said particles are fractured.

6. In apparatus for producing from ground perlite particulate material suitable for use as a filter aid, the combination of a vertically elongated furnace for expanding perlite particles, means for feeding ground perlite through a side opening into said furnace, means for feeding a combustion gas at a high velocity into the lower end of said furnace, the upper end of said furnace having a constricted outlet opening whereby the velocity of upwardly-rising expanded perlite particles and gaseous products of combustion is greatly increased, walls forming a cylindrical chamber above and surrounding said constricted outlet, an outer inverted conical element having an open upper end secured to said walls, the lower end of said conical element being open and positioned directly above said outlet opening, the inner and outer surfaces of said conical element being provided with rasp-like comminuting means, a deflector element depending from the lower end of said conical element, and an inner inverted conical element having upper and lower open ends, said inner conical element being operably connected to said walls for vertical adjustment with respect to said outer conical element and nested within and coaxial with said outer conical element, the inner and outer surfaces of said inner conical element being provided with rasp-like comminuting means, said comminuting means adapted to be contacted by said expanded perlite particles whereby a major portion of said particles are fractured.

7. In apparatus for producing from ground perlite particulate material suitable for use as a filter aid, the combination of a vertically elongated furnace for expanding perlite particles, means for feeding ground perlite through a side opening into said furnace, means for feeding a combustion gas at a high velocity into the lower end of said furnace, the upper end of said furnace having a constricted outlet opening whereby the velocity of upwardly-rising expanded perlite particles and gaseous products of combustion is greatly increased, walls forming a cylindrical chamber above and surrounding said constricted outlet, an outer inverted conical element having an open upper end secured to said walls, the lower end of said conical element being open and positioned directly above said outlet opening, the inner and outer surfaces of said conical element being provided with rasp-like comminuting means, a deflector element depending from the lower end of said conical element, an inner inverted conical element having upper and lower open ends, said inner conical element being operably connected to said walls and nested within and coaxial with said outer conical element, the inner and outer surfaces of said inner conical element being provided with rasp-like comminuting means and the inner surface of said walls being provided with similar rasp-like comminuting means, said comminuting means adapted to be contacted by said expanded perlite particles whereby a major portion of said particles are fractured, means for separating said fractured particles from the unfractured particles, conduit means connecting said separating means with said chamber, a Venturi section in said conduit means for increasing the velocity of the particles, an abrader assembly in said conduit means, second conduit means connecting said separating means with said chamber for recirculation of unfractured material, blower means in said second conduit means, and an abrader assembly in said second conduit means.

References Cited in the file of this patent
UNITED STATES PATENTS

| | | |
|---|---|---|
| 90,097 | Handord | May 18, 1869 |
| 864,209 | Stokoe | Aug. 27, 1907 |
| 1,571,518 | Foster | Feb. 2, 1926 |
| 2,055,385 | Noack | Sept. 22, 1936 |
| 2,431,884 | Neuschotz | Dec. 2, 1947 |
| 2,651,470 | Dodds et al. | Sept. 8, 1953 |
| 2,665,813 | Bollaert | Jan. 12, 1954 |
| 2,666,632 | Culver et al. | Jan. 19, 1954 |
| 2,798,674 | Denning | July 9, 1957 |

OTHER REFERENCES

Compressed Air Magazine, article on page 6694, vol. 47, 1942.